INVENTOR
HARRY H. LOOKE

Patented Nov. 22, 1949

2,489,191

UNITED STATES PATENT OFFICE 2,489,191

FLUID SEAL FOR ROTATING SHAFTS

Harry Hansen Looke, Caulfield, Victoria, Australia

Application March 13, 1947, Serial No. 734,520
In Australia March 14, 1946

3 Claims. (Cl. 286—11.15)

1

This invention relates to an improved fluid seal for rotating shafts and refers especially, but is not limited, to means for sealing rotary pumps and the like against the passage of liquid into or from the bearings of their rotating shafts.

Hitherto it has been normal practice to seal by means of a stuffing-box or gland the annular space between a rotating shaft and the housing or the like through which it passes, but the use of stuffing-boxes is subject to certain disadvantages, including the cost, the space occupied, the necessity for adjustment to take up wear, and the absorption of power through friction.

An object of this invention is to provide an improved seal which is simple and economical to manufacture and instal, which occupies little space, and which is capable of automatic self-adjustment to take up wear.

According to the invention, I provide a fluid seal for rotating shafts which comprises a housing, a shaft rotatable in the housing, a thrust ring surrounding the shaft and rotatable therewith, a sealing face on the housing, a sealing face on one end of the thrust ring adapted to rotate in pressure contact with the sealing face on the housing, means for maintaining said sealing faces in pressure contact, dogs on the opposite end of the thrust ring, inclined side faces on the dogs, a driving member mounted on and secured to the shaft, inclined faces on the driving member which engage the inclined faces of the dogs and impart rotation to the thrust ring while urging it towards the housing, a peripheral flange on the thrust ring, the outer face of said peripheral flange being conical, a sealing ring mounted slidably on the shaft between the thrust ring and the driving member, the opposed faces of the thrust ring and sealing ring being oppositely inclined, a ring-shaped insert of compressible material between the thrust ring and the sealing ring and in contact with the shaft, a compression spring disposed to surround the shaft, one end of said compression spring engaging the driving member and the other end of said compression spring engaging the sealing ring, the compression spring urging the sealing ring towards the thrust ring and tending to compress the ring-shaped insert against the shaft.

The thrust ring is preferably provided with a flat end face which rotates in pressure contact

2 with a flat face on the housing or with a rubber or other washer or insert in contact with the housing, thereby ensuring a substantially fluid-tight joint between the relatively moving faces. The driving member is provided with tapered recesses into which the dogs on the thrust ring fit, the said recesses having inclined side edges which engage the inclined side faces of the dogs on the thrust ring, whereby the thrust ring is urged towards the housing by rotation of the shaft. The driving member may comprise a collar or the like secured to the shaft and having dogs or projections which engage those on the thrust ring, or where the seal is used with a rotary pump, for example, the dogs or projections on the thrust ring may engage the inclined side faces of recesses formed in the rotor of the pump.

An important feature of the invention resides in the above-described construction whereby the sealing face on the thrust ring is forced into pressure contact with the sealing face on the housing by rotation of the shaft. A further important advantage is that increase in the speed of rotation automatically increases the pressure between the said sealing faces, thus improving the fluid seal at the time when the increased fluid pressure normally tends to cause leakage.

A further feature of the invention resides in the fact that there is no relative rotary movement between the thrust ring, shaft, insert and sealing ring, and consequently the possibility of leakage therebetween is small. Moreover, the insert and shaft are not subject to wear, such as that which occurs in a stuffing-box.

A peripheral flange having an outer conical or inclined face is preferably provided on the thrust ring to enable fluid pressure within the housing to assist in maintaining the thrust ring in contact with the wall of the housing. According to a feature of my invention, therefore, the thrust ring is held in pressure contact with the housing or other fixed member, firstly, by the action of the driving member on the inclined faces of the dogs or projections, secondly, by the action of the spring or the like on the sealing ring and insert, and thirdly, by the fluid pressure against the peripheral flange.

Reference will now be made to the accompanying drawings wherein.

Figure 1:
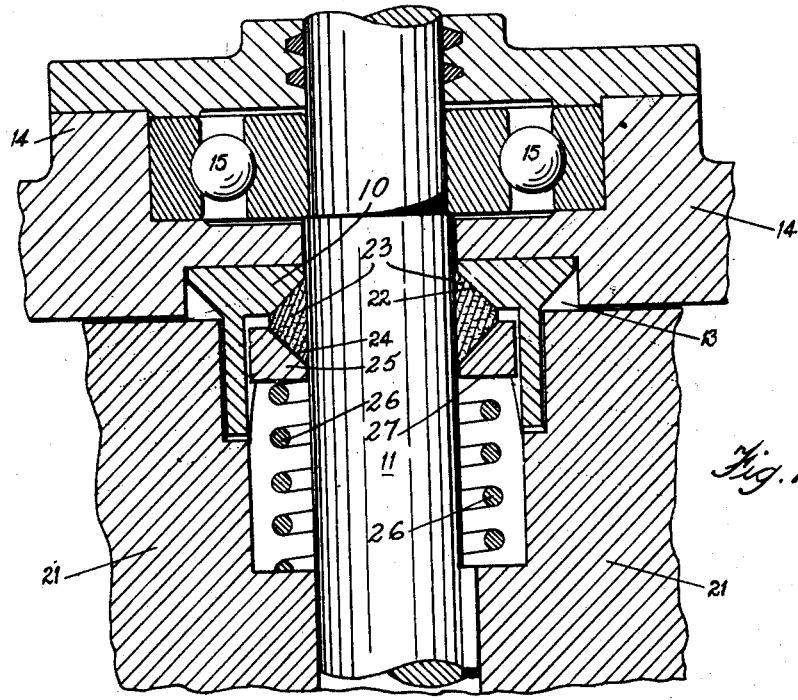
Figure 1 is a view in sectional plan of a fluid seal for a rotary pump, constructed in accordance with the invention.

Referring to the drawings, the reference numeral 10 indicates a thrust ring which is mounted on the shaft 11 and is provided on one end with a flat sealing face 12 which is adapted to rotate in pressure contact with the sealing face formed by the flat bottom of a recess 13 formed in the pump housing 14 through which the shaft 11 passes. A bearing containing balls 15 is mounted in the housing 14 to carry the shaft 11.

The said face 12 of the thrust ring 10 is ground flat, and the face of the housing 14 with which it is in contact is also ground flat. Alternatively, a washer or insert (not shown) of rubber, plastic or other wear-resistant material may be provided in the recess 13 to ensure a leak proof joint between the abutting relatively moving faces. The thrust ring 10 may be formed of metal, rubber, plastic or other suitable material.

Figure 2:
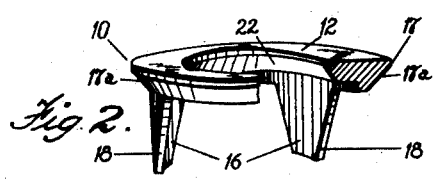
Figure 2 is a perspective view of the thrust ring.
Figure 3:
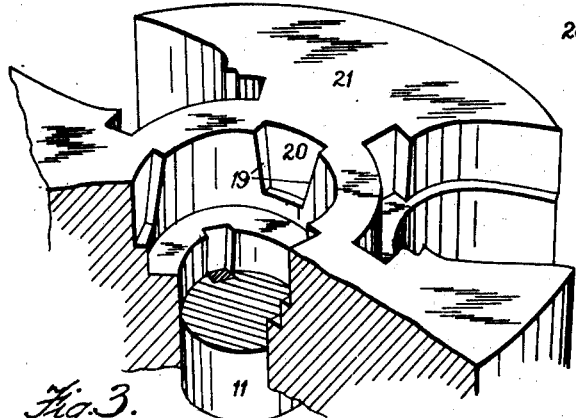
Figure 3 is a perspective view of the pump rotor showing the recesses therein which are engaged by the dogs on the thrust ring.

A series of integral dogs 16 are formed on the opposite end of the thrust ring 10 and extend in a direction parallel to the shaft 11. In the construction shown in Figures 1 to 3, three dogs 16 are shown, but any suitable number may be used. A peripheral flange 17 is formed on the thrust ring 10, and the outer face 17a of the thrust ring 10 between its periphery and the dogs 16 is formed at an acute angle to the flat face 12.

The opposed side edges 18 of the dogs 16 are inclined to converge towards the free ends of said dogs 16 and are adapted to engage the inclined side edges 19 of recesses 20 formed in the inner periphery of the pump rotor 21. Rotation of the shaft 11 causes the inclined faces 19 on the rotor 21 to engage the inclined edges 18 of the dogs 16 and thus rotate the thrust ring 10, while at the same time forcing it towards the housing 14, thereby increasing the seal between the thrust ring 10 and the said housing.

The inner surface 22 of the thrust ring 10 within the series of dogs 16 is inclined in the opposite direction to the outer surface 17a, and a ring or insert 23 of felt, synthetic rubber or other compressible or resilient material surrounds the shaft 11 and fits between the inclined inner surface 22 of the thrust ring 10 and the oppositely inclined surface 24 of a sealing ring 25 which is slidable on the shaft 11. A compression spring 26 surrounds the shaft 11 and is fitted between the opposite face 27 of the sealing ring 25 and the rotor 21 or an abutment on the shaft (not shown). The spring 26 tends to move the sealing ring 25 towards the thrust ring 10 and thereby compresses the felt ring or insert 23 against the shaft 11 and against the thrust ring 10. In addition the spring 26 assists in maintaining the thrust ring 10 in pressure contact with the housing 14.

By this means the passage of liquid along the shaft 11 or between the shaft 11 and the housing 14 is effectively prevented. Wear of the coacting surfaces of the thrust ring 10 and housing 14 is automatically taken up by axial movement of the thrust ring 10. By providing a sealing device of the above description at each end of the rotor 21, the latter may be kept central in the housing 14 and end wear minimised.

It will be understood that any suitable packing material may be employed, and that any approved means may be used to exert axial pressure on the thrust ring 10 and on the sealing ring 25 for the purposes herein described.

Figure 4:
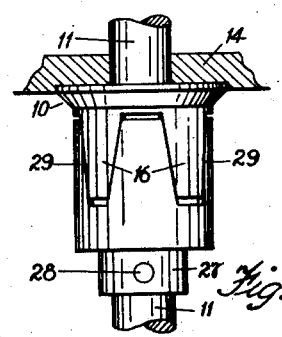
Figure 4 is a view in plan of a modification of the invention.

In the modification of the invention shown in Figure 4, a collar or driving member 27 is secured to the shaft 11 by a pin 28 and is provided with integral dogs 29 or the like which engage the dogs 16 on the thrust ring 10 and impart rotation to it while forcing it axially against the thrust face on the housing 14. In the construction shown in this figure, four dogs 16 and four dogs 29 are provided. A sealing ring, resilient insert and compression spring are provided around the shaft as in the previous construction, the end of the compression spring being caused to abut against the collar or driving member 27.

I claim:

1. A fluid seal for rotating shafts which comprises a housing, a shaft rotatable in the housing, a thrust ring surrounding the shaft and rotatable therewith, a sealing face on the housing, a sealing face on one end of the thrust ring adapted to rotate in pressure contact with the sealing face on the housing, means for maintaining said sealing faces in pressure contact, dogs on the opposite end of the thrust ring, inclined side faces on the dogs, a driving member mounted on and secured to the shaft, inclined faces on the driving member which engage the inclined faces of the dogs and impart rotation to the thrust ring while urging it towards the housing, a peripheral flange on the thrust ring, the outer face of said peripheral flange being conical, a sealing ring mounted slidably on the shaft between the thrust ring and the driving member, the opposed faces of the thrust ring and sealing ring being oppositely inclined, a ring-shaped insert of compressible material between the thrust ring and the sealing ring and in contact with the shaft, a compression spring disposed to surround the shaft, one end of said compression spring engaging the driving member and the other end of said compression spring engaging the sealing ring, the compression spring urging the sealing ring towards the thrust ring and tending to compress the ring-shaped insert against the shaft.

2. A fluid seal according to claim 1 wherein recesses are formed in the driving member into which the dogs on the thrust ring fit, the side edges of the said recesses being inclined and engaging the inclined side faces of the dogs.

3. A fluid seal for rotating shafts which comprises a housing, a shaft rotatable in the housing, a thrust ring surrounding the shaft and rotatable therewith, a sealing face on the housing, a sealing face on one end of the thrust ring adapted to rotate in pressure contact with the sealing face on the housing, means for maintaining said sealing faces in pressure contact, dogs on the opposite end of the thrust ring, inclined side faces on the dogs, an annular space between the dogs and the shaft, a driving member mounted on and secured to the shaft, tapered recesses in the driving member into which the dogs on the thrust ring fit, the said recesses having inclined side edges which engage the inclined side faces of the dogs and force the sealing face of the thrust ring into pressure contact with the sealing face of the housing when the shaft is rotating, the pressure between the said sealing faces being thereby increased with increase in the speed of rotation of the shaft, a peripheral flange on the thrust ring, the outer face of said peripheral flange being conical, a sealing ring mounted slidably on the shaft within the annular space, the opposed faces of the thrust ring and sealing ring being oppositely inclined, a ring-shaped insert of compressible material between the thrust ring and the sealing ring and in contact with the shaft, a compression spring disposed to surround the shaft, one end of said compression spring engaging the driving member and the other end of said compression spring engaging the sealing ring, the compression spring urging the sealing ring towards the thrust ring and tending to compress the ring-shaped insert against the shaft.

HARRY HANSEN LOOKE.

REFERENCES CITED

The following references are of record in the file of this patent:

UNITED STATES PATENTS

| Number | Name | Date |
|---|---|---|
| 1,480,951 | Plummer et al. | Jan. 15, 1924 |
| 1,821,543 | Coultas | Sept. 1, 1931 |

FOREIGN PATENTS

| Number | Country | Date |
|---|---|---|
| 27,111 | Great Britain | of 1913 |